United States Patent [19]

Nishihira

[11] Patent Number: 4,464,326
[45] Date of Patent: Aug. 7, 1984

[54] METHOD OF MANUFACTURING CONTACT RUBBER STRUCTURE

[75] Inventor: Toshihiro Nishihira, Tokyo, Japan

[73] Assignee: Fuji Rubber Co. Ltd., Japan

[21] Appl. No.: 423,154

[22] Filed: Sep. 24, 1982

[30] Foreign Application Priority Data

Feb. 15, 1982 [JP] Japan ................................. 57-21174

[51] Int. Cl.³ ........................... B29C 17/00; B29F 1/12
[52] U.S. Cl. .................................... 264/246; 156/245;
264/250; 264/259
[58] Field of Search ............... 264/250, 255, 259, 245,
264/246, 247, 297; 156/245

[56] References Cited

U.S. PATENT DOCUMENTS

| | | | |
|---|---|---|---|
| 2,185,924 | 1/1940 | Pereira | 264/255 |
| 3,013,913 | 12/1961 | Croop et al. | 264/255 |
| 3,268,643 | 8/1966 | Katzenmeyer | 264/250 |
| 3,719,735 | 3/1973 | Valyi | 264/255 |
| 3,776,998 | 12/1973 | Church | 264/297 |
| 3,879,245 | 4/1975 | Fetherston et al. | 156/245 |
| 4,067,102 | 1/1978 | Durocher et al. | 264/250 |
| 4,069,290 | 1/1978 | Pasch | 264/297 |
| 4,348,003 | 9/1982 | Beneteau | 249/160 |
| 4,385,025 | 5/1983 | Salerno et al. | 264/255 |

Primary Examiner—Willard E. Hoag
Attorney, Agent, or Firm—McGlew and Tuttle

[57] ABSTRACT

In a method of manufacturing a contact rubber structure, colored, hard, non-vulcanized rubber materials are injected into cavities of a mold for molding key top portions. A mold for molding key sheet portions is placed over the key top portions formed by the foregoing molding step. A non-vulcanized rubber material which is softer than the material of each key top portion is charged, compressed and heated, so that the key sheet portions are made to be integral with the key top portions.

3 Claims, 4 Drawing Figures

METHOD OF MANUFACTURING CONTACT RUBBER STRUCTURE

BACKGROUND OF THE INVENTION

1. Field of the Invention

This invention relates to a method of manufacturing an integral key top type contact rubber structure including a multiplicity of push keys, which is usable with a variety of apparatus which are so designed that inputting is effected through manipulation of buttons.

2. Description of the Prior Art

Referring to FIG. 1, there is shown a conventional push key assembly including a contact rubber structure 1 which supports key tops 2 each formed of a material which is harder than that of the contact rubber structure, by means of a frame 3. Indicated at 4 are electrodes printed on a printed circuit board 5.

Disadvantageously, however, the above conventional push key assembly, when it is to be formed, requires time-consuming and troublesome procedures in that variously colored key tops should be chosen, arranged on the contact rubber structure and then supported by means of the frame. Another disadvantage is that the prior-art assembly is not satisfactory in its water-proof and dust-proof properties.

SUMMARY OF THE INVENTION

Accordingly, it is an object of the present invention to provide a method of making a contact rubber structure having key tops formed integrally therewith, thereby effectively obviating the disadvantages with the prior art.

Briefly, according to the present invention, a multiplicity of key top portions each formed of a colored, hard material can be simultaneously vulcanized and molded with respect to lower sheet portions formed of a soft material.

Other objects, features and advantages of the present invention will become apparent from the ensuing description taken in conjunction with the accompanying drawings.

DESCRIPTION OF THE PREFERRED EMBODIMENTS

Figure 1:
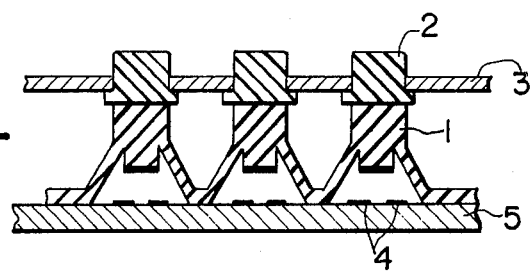
FIG. 1 is a schematic sectional view showing the conventional push key assembly.
Figure 2:
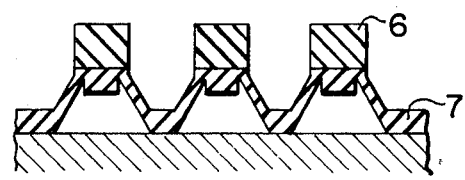
FIG. 2 is a schematic sectional view showing the contact rubber structure produced according to the present invention.
Figure 3:
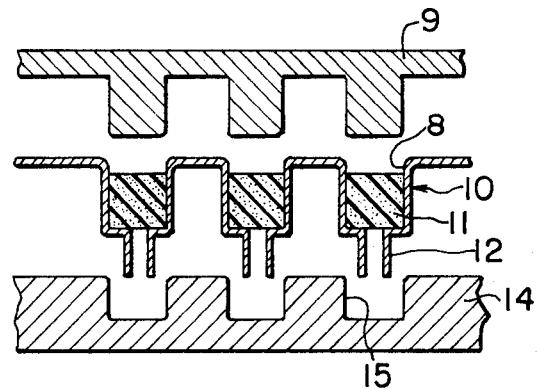
FIGS. 3 and 4 are schematic sectional views illustrating the manufacturing steps in the method of the present invention.
Figure 4:
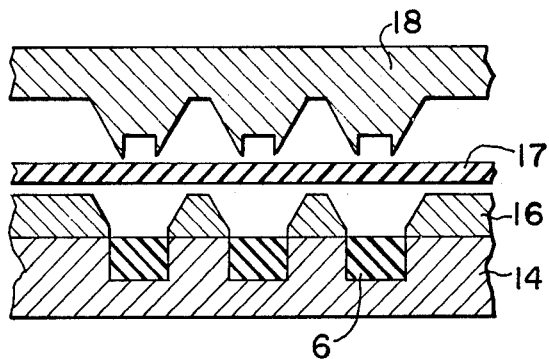

Description will now be made of an embodiment of the present invention with reference to FIG. 3, wherein suitably colored, hard, non-vulcanized rubber materials are contained in an injection apparatus 10 provided with a multiplicity of rubber reservoir portions 8 each having a gate 12 provided at the bottom thereof. Subsequently a ram 9 is downwardly moved so that its convex or projecting portions are loaded into the rubber reservoir portions 8, whereby the rubber materials contained in the reservoir portions 8 are injected, through the gates 12 provided at the bottoms of the reservoir portions, into cavities 15 defined in an underlying lower mold 14. In this way, a multiplicity of colored key top portions are molded. Thereafter, as shown in FIG. 4, the injection apparatus 10 is replaced by a lower female mold 16 adapted for molding the key sheet portions, and the lower female mold 16 is placed on the lower mold 14 having its cavities 15 charged with the colored rubber materials constituting the key top portions 16. At this time, a soft sheet rubber material 17 is placed on the lower female mold 16, the material is compressed from above by means of a male mold 18 and it is heated so that the sheet is bonded to the key portions as a consequence, such a contact rubber structure as shown in FIG. 2 is formed which comprises key top portions 6 and key sheet portions 7 which are formed integrally with each other. The material of 17 and 6 are initially non-vulcanized but by the heating and compression step they become vulcanized and bonded to each other. In the course of manufacture, the key top portions 6 and key sheet portions 7 are positioned in up-side-down relationship as shown in FIGS. 3 and 4.

Needless to say, the respective molds are so previously constructed as to provide the resultant contact rubber structure with an arrangement corresponding to that of the apparatus to which the contact rubber structure is applied.

As will be appreciated from the above description, according to the method of the present invention, it is possible to avoid the time-consuming and troublesome procedures of separately molding the key top portions and assembling them by using a frame as in the prior art. According to the present invention, a multiplicity of key tops, which are different in hardness and color, can be simultaneously vulcanized and molded to be integral with key sheet portions. Thus a multi-contact rubber structure having an improved appearance can be produced, on a mass-production basis, without requiring much labor and in a shorter time.

While the present invention has been described and illustrated with respect to a specific embodiment, it is to be understood that the present invention is by no means limited thereto but covers all changes and modifications which will become possible without departing from the scope and spirit of the present invention.

What is claimed is:

1. A method of manufacturing a contact rubber structure, comprising the steps of:
    injecting colored rubber materials into a plurality of cavities of a first mold member for molding a plurality of key top portions, said rubber being vulcanizable into a hard condition,
    placing over said key top portions a second mold member for molding key sheet portions to be connected to the key top portions said second mold member having at least one through aperture mold cavity vulcanizable to a lower hardness than that of the material of each of said key top portions between the first and second mold members;
    compressing portions of the sheet material into said second mold member and against the key top portions and heating the sheet material and key top portions sufficiently to vulcanize the sheet material and key top portions together to form the contact rubber structure.

2. A method as set forth in claim 1, wherein said injecting step is carried out by using an injection apparatus including a predetermined number of rubber reservoir portions.

3. A method of manufacturing a contact rubber structure comprising key top portions and key sheet portions which are integral with each other, wherein suitably colored, vulcanizable rubber material suitable for being vulcanized into a hard condition is contained in an injection apparatus provided with a multiplicity of rubber reservoir portions each having a gate provided at the bottom thereof; subsequently, a ram provided with convex portions is downwardly moved so that the convex portions thereof are loaded into the reservoir portions of said injection apparatus, whereby the rubber material contained in the reservoir portions are injected, through said gates, into cavities defined in a lower mold member, so that a multiplicity of colored key top portions are molded; thereafter, said injection apparatus is replaced with a lower female mold member having through openings adapted for molding said key sheet portions, and the lower female mold is placed on said lower mold member; and a soft vulcanizable sheet rubber material is placed on said lower female mold member, compressed from above by means of a male mold member and deformed into said lower female mold member and heated to vulcanize the soft sheet rubber material to the key top portions to form the contact rubber structure.

* * * * *